Figure 4:
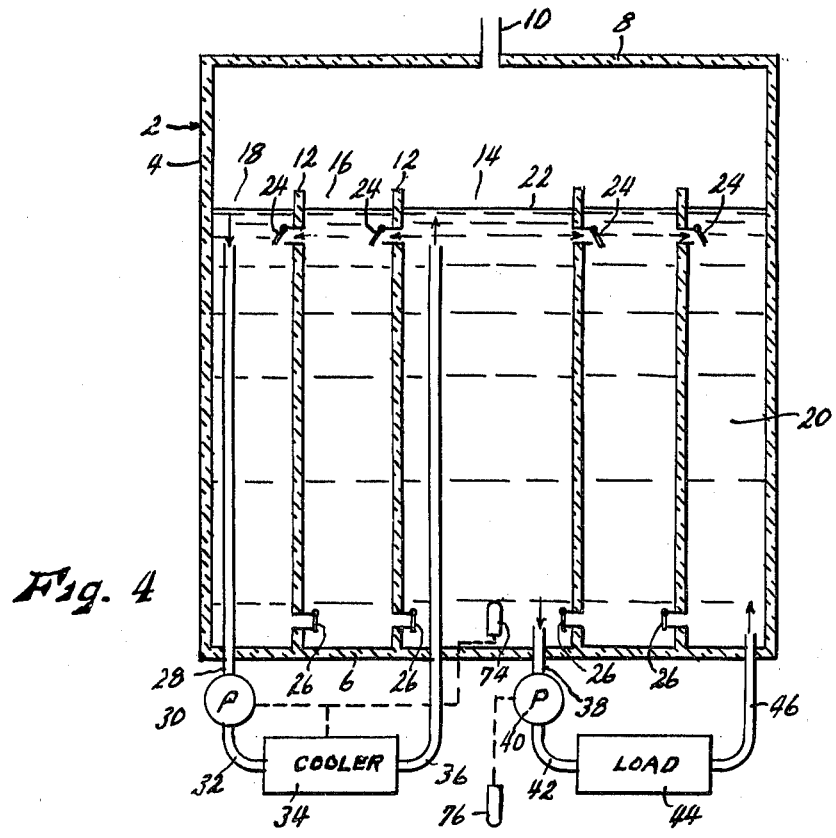

United States Patent [19]

Brautigam

[11] 4,158,384
[45] Jun. 19, 1979

[54] HEAT STORAGE SYSTEM

[76] Inventor: Robert F. Brautigam, P.O. Box 102, Agenda, Kans. 66930

[21] Appl. No.: 825,652

[22] Filed: Aug. 18, 1977

[51] Int. Cl.² ............................................. F28D 21/00
[52] U.S. Cl. .................................. 165/32; 165/104 S; 165/107 D; 62/430; 126/400
[58] Field of Search .................. 165/104 S, 32, 107 D; 126/400; 62/430

[56] References Cited

U.S. PATENT DOCUMENTS 3,799,145  3/1974  Butterfield .................... 165/104 S X Primary Examiner—Albert W. Davis, Jr.
Attorney, Agent, or Firm—John A. Hamilton

[57] ABSTRACT

A heat storage system consisting of a compartmented tank containing a liquid medium capable of storing heat therein, a flow control system operable to establish a liquid flow in the tank operable to concentrate the hottest liquid in a compartment remote from the outer tank wall, and sucessively less hot liquid in compartments successively closer to the outer tank wall, whereby to minimize heat loss from the tank through its walls, a pumping system operable to remove liquid from the coolest compartment of the tank to an external heater and return it to the hottest compartment of the tank, and a pumping system operable to remove liquid from the hottest region of the tank to a heat-consuming external load device such as a home heating system, and return it to the coolest region of the tank. A simple reversal of parts permits the system to be used for the storage of negative heat, or cold, for use in operating a heat-absorbing external load device, such as a home cooling system. In the hot tank form, some of the tank liquid may be vaporized and the latent heat of vaporization stored for future use, and in the cold tank, some of the tank liquid may be frozen and the latent heat of fusion stored for future use.

9 Claims, 5 Drawing Figures

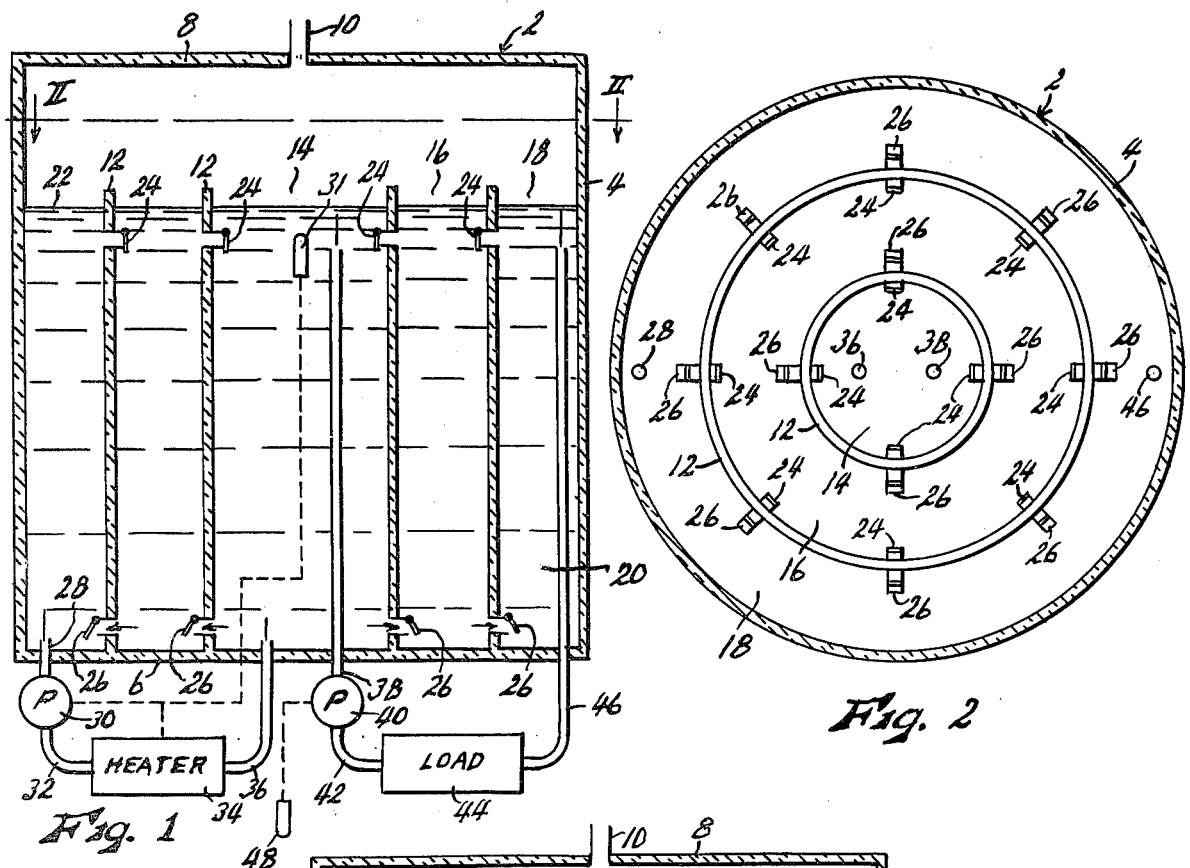
Fig. 1
Fig. 2
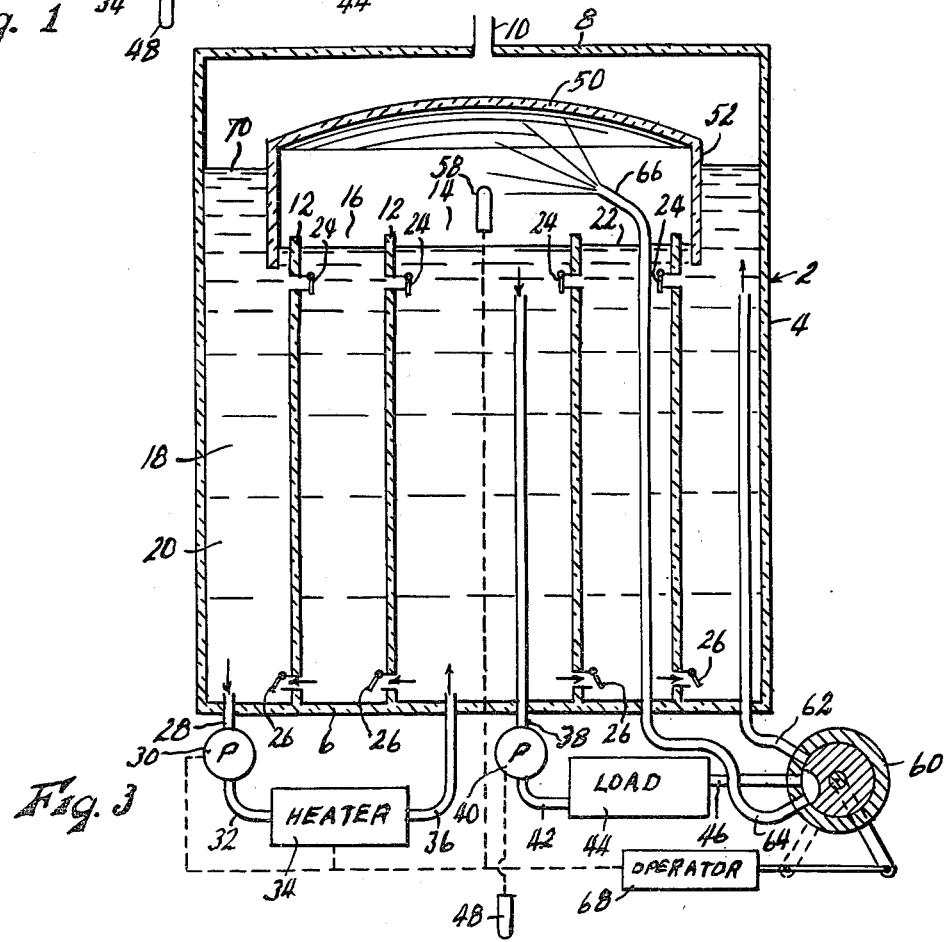
Fig. 3

HEAT STORAGE SYSTEM

This invention relates to new and useful improvements in heat storage systems, and has as its principal object the provision of a means whereby either positive or negative heat, that is, temperatures either above or below atmospheric, may be trapped and stored for future use when needed, said heat being stored in a liquid medium contained in an insulated tank. The system has been envisioned primarily as an economical system for heating and cooling homes or other buildings, although its use is not limited to this function. For this purpose, the system would usually include both a "hot" tank for storing a hot liquid to assist in the operation of a home heating system, and a "cold" tank for storing a cold liquid to assist in the operation of a home cooling system. Both the hot and cold tanks may be substantially identical except for a simple reversal of certain elements thereof. Each tank has external input and load flow circuits each operable to circulate liquid from the tank, respectively through a heating or cooling device, and a heat-consuming or heat-absorption load device, and return the liquid to the tank. The overall object of the system is that the input devices may operate at a level less than the peak load demand, thereby storing heat or cold during periods of lesser load demand, for later use in periods of greater demand. Thus, depending on the storage capacity of the tank, it can supply a home heating system, or a home cooling system, for substantial periods of time before requiring additional input of heat or cold, and valuable equipment, fuel and energy economies may be realized.

Another object is the provision of a system of the character described wherein the tank is partitioned to provide a series of compartments including a central compartment remotely spaced from the outer tank walls, and a plurality of additional compartments spaced successively closer to the outer tank walls, and suitable valves operable to produce gravity and convection currents of liquid within the tank whereby liquid of the most extreme temperature, either hot or cold, from either the input or load returns, will tend to be conducted to and retained in the central compartment, with liquid of successively less extreme temperatures being conducted to and retained in compartments successively outward from said central compartment. In this manner, the temperature differentials across the compartment walls, and across the outer wall of the tank, are reduced to a minimum, whereby to reduce the quantity of heat transferred through said walls and eventually lost to the atmosphere. The compartment and tank walls may also be insulated to further reduce such losses.

A further object is the provision of a system of the character described wherein the operating temperature differentials at the load and input devices, and also the convection flow of liquid in the tank, are assisted by the fact that the input flow circuit withdraws liquid from the compartment of the tank wherein the liquid temperature is the least extreme, and returns it to the compartment of the most extreme temperature, while the load flow circuit withdraws liquid from the tank compartment of the most extreme temperature, and returns it to the tank compartment of the least extreme temperature.

A still further object is the provision of a system of the character described wherein is provided means whereby a portion of the tank liquid may be vaporized in a "hot" tank, or frozen in a "cold" tank, and the latent heat of vaporization or fusion stored for future use.

Other objects are relative simplicity and economy of construction, and efficiency and dependability of operation.

Figure 5:
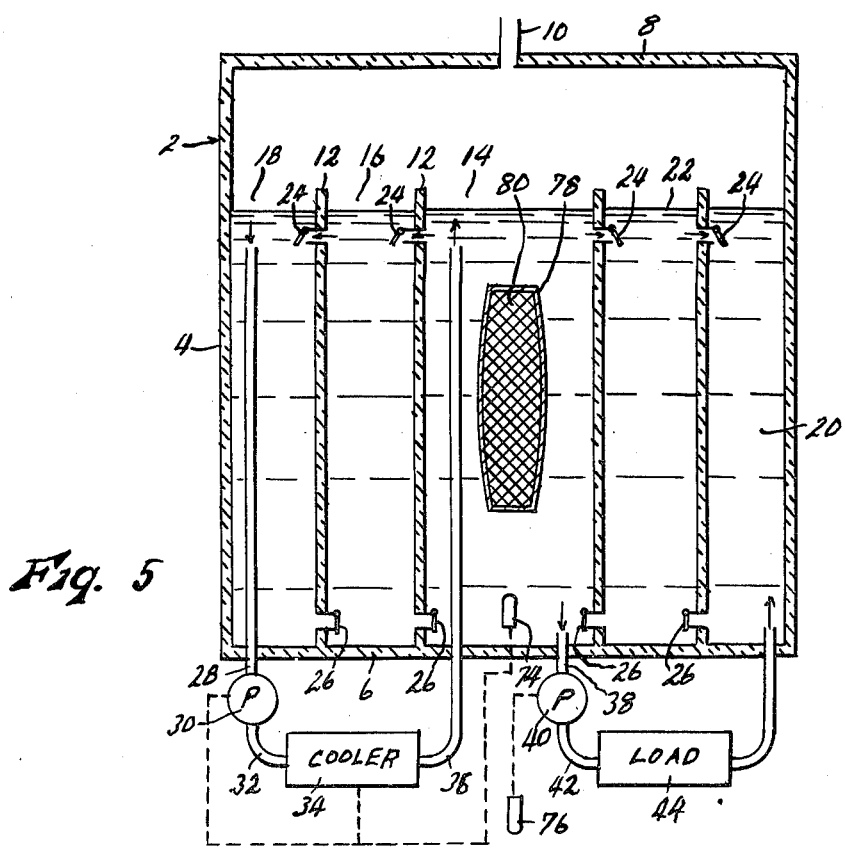

With these objects in view, as well as other objects which will appear in the course of the specification, reference will be had to the accompanying drawing, wherein:

FIG. 1 is a schematic representation of a heat storage system embodying the present invention, including a vertical sectional view of the tank forming a principal element of the system, arranged to store positive heat, FIG. 2 is a sectional view taken on line II—II of FIG. 1, FIG. 3 is a view similar to FIG. 1, but including means permitting vaporization of a portion of the tank liquid and storage of the latent heat of vaporization, FIG. 4 is a view similar to FIG. 1, but with the parts arranged to store negative heat, and FIG. 5 is a view similar to FIG. 4, but including means permitting freezing of a portion of tha tank liquid and storage of the latent heat of fusion.

Like reference numerals apply to similar parts throughout the several views. All forms of the invention include a large tank 2, here shown as having a vertical cylindrical outer wall 4, a bottom wall 6, and a top wall 8, although its specific shape is optional. Top wall 8 is provided with an atmospheric vent 10, which may be suitably hooded when necessary. The interior of the tank is divided by a plurality of concentric walls 12, extending from bottom wall 6 to an elevation spaced below top wall 8, into a central compartment 14 and a plurality of annular ring compartments 16 and 18 surrounding central compartment 14 in successively outwardly spaced relation therefrom. The outer wall of ring compartment 18 is formed by vertical tank wall 4. Walls 12 are shown as cylindrical, although this is optional. All of the tank walls, as well as walls 12, are preferably insulated as indicated, in order to minimize heat transfer therethrough.

Referring more specifically to FIGS. 1 and 2, which diagram a simple form of the system operable to store positive degrees of heat well above atmospheric temperatures, the tank 2 is charged with a liquid 20 to a level 22 somewhat below the level of the upper edges of walls 12. For convenience and clarity, liquid 20 will be described as water, although it will be readily apparent that liquids other than water could be used if desired. Each of walls 12 has a plurality of inwardly opening upper check valves 24 disposed adjacent the upper edge thereof, below the water level 22 therein, and spaced angularly about the periphery thereof, and a plurality of outwardly opening lower check valves 26 disposed adjacent the lower edge thereof, just above the bottom wall 6 of the tank, and spaced angularly about the periphery thereof.

In an input flow circulating system, water is drawn from the lowermost portion of outermost tank compartment 18 through a pipe 28, and delivered by said pump to a heat exchanger 34, which in the case of a "hot" tank is a heater capable of elevating the temperature of the water. Said heater may utilize heat from any available source, such as a gas or oil burner, or furnace, or a solar heat collecting device, or heat which would otherwise be wasted, such as the exhaust from steam engines or turbines, or heat exhausted from an air conditioning or refrigeration system. Use of the heat exhaust from an air conditioning system is particularly useful in a combined heating-cooling system for a home, in that heat removed from the home during periods of air conditioning may be captured and stored for use in periods of heating demand. Water from heater 34, still driven by pump 38, is returned through pipe 36 to the lowermost portion of central tank compartment 14. In a load flow circulating system, water is drawn from the topmost portion of central tank compartment 14 through a pipe 38 by an external pump 40, and delivered by said pump through a pipe 42 to a load device 44 in which heat of the water is consumed. Said load may, for example, constitute the hot water heating system of a house. The return water from the load, still driven by pump 40, is carried through a pipe 46 and deposited thereby into the topmost portion of outermost tank compartment 18. Either or both of pumps 30 and 40 may be operative at any given moment, but in any case the amount of water removed from the tank is returned thereto, and the amount of water in the tank therefore remains substantially constant.

In operation of the species of the invention shown in FIGS. 1 and 2, the operation of input pump 30 would ordinarily be controlled by suitable thermostatic means 31 operable to actuate said pump whenever the maximum water temperature in the tank, which as will appear occurs at the surface level of central compartment 14, falls below a pre-determined level, and to deactuate said pump whenever said temperature rises to a predetermined maximum safe level, for example just below the boiling point. The thermostatic means may also control the operation of heater 34. Whenever pump 30 is operative, therefore, water heated by said heater is delivered by pipe 36 to central tank compartment 14, wherein the hotter water rises by convection toward the water level 22, and cooler water sinks toward the tank bottom. Also, if load pump 40 is not then operating due to lack of load demand for heat, the water level in compartment 14 will rise slightly above the level in compartment 16, and the pressure differential thus created across wall 12 separating these compartments causes upper check valves 24 of said wall to close, and lower check valves 26 to open, so that the cooler water at the bottom of chamber 14 flows outwardly through valves 26 into chamber 16. In chamber 16, the process repeats itself, the hotter water rising and the cooler water sinking, and the water level rising to create a pressure differential closing upper check valves 24 and opening lower check valves 26 in the wall 12 separating compartments 16 and 18, so that the coolest water of chamber 16 flows to chamber 18, where the hotter water again rises and the cooler water sinks for removal by pump 30. Thus when equilibrium has been established, the liquid level in the successive compartments will be graduated downwardly from the central compartment outwardly, and there will be a continuous water flow from the central compartment to the successive outer compartments, and through pump 30 and heater 34 back to the central compartment. The hottest water in each compartment will be adjacent the top level thereof, and the temperature at the top of chamber 14 will be the highest of all, with general temperatures in the successive outer chambers being successively lower.

The temperatures of the water in all of the compartments will continue to rise so long as heater 34 continues to supply heat at a greater rate than is consumed by load 44, until, presuming that heater 34 is capable of supplying heat at a sufficiently high temperature, water in the tank boils and the steam passes off through vent 10, unless a suitable thermostatic control, as described, is provided to shut off the heater before this occurs. The concentration of the hottest water in the central tank compartment, with successively cooler water in the outer compartments, does much to conserve the heat and prevent loss thereof through the tank walls. The temperature differential across each of walls 12, and across outer tank wall 4, is thus greatly reduced, which reduces the amount of heat conducted therethrough, and eventually lost through the outer tank wall. More compartments than the three actually shown would increase this saving. With a sufficient number of compartments, the normal temperature of the water in the outermost compartment could be reduced almost to atmospheric level, so that there would be very little heat loss through outer tank wall 4 even if said wall were not insulated. It is of course important that the combined flow rates of input pump 30 and load pump 40, moving through the tank, not be sufficiently high to interfere materially with convection water currents in the tank, since it is these currents, in combination with the pressure-induced opening and closing of check valves 24 and 26, which concentrate the hottest water in each compartment at the top thereof where, as will appear, its heat may best be utilized. For this reason, the water capacity of the tank should be very large as compared to the pump flow rates. For example, in the use of the tank in the heating systems of ordinary homes, a tank capacity of at least several thousand gallons is recommended.

Operation of load pump 40 would ordinarily be controlled by a suitable thermostatic means 48 operable to actuate said pump whenever load 44 calls for heat. Pump 40 has a higher delivery rate than pump 30, and whenever said pump is operating, it draws water from the top level of central tank compartment 14, which as previously described always contains the hottest liquid present in the tank, delivers it to load 44 wherein heat is extracted therefrom, and returns it at a relatively low temperature to the top of outermost tank compartment 18. When the flow rate of pump 40 is less than the input flow rate of pump 30, which could occur only when the demand for heat is zero, the previously described outward flow pattern of water in the tank as induced by pump 30 will continue. The flow rate of pump 40 exceeds that of pump 30, since an important object of the system is that a comparatively low but relatively continuous input flow will store heat in the tank sufficient to supply the required heat for the relatively high but less continuous load flow. The liquid level in outer tank compartment 18 will thus rise slightly relative to that in compartment 16, causing lower check valves 26 of outer wall 12 to close, and upper check valves 24 to open to allow the surface water of compartment 18 to flow into compartment 16, where the process is repeated to close lower check valves 26 and open upper check valves 24 of inner wall 12. Thus the liquid levels in the compartments are reversed to grade downwardly from the outermost to the central compartment. The gradations of water level in the various compartments are very slight, and at no time are the upper check valves 24 ever exposed above the water level. Thus the hottest water in each compartment, which of course is at its top, flows inwardly toward the central compartment to be available for load use. In this manner, virtually all of the heat carried in the tank water is made available for load use in periods of high demand. At this time, any heat delivered by input pump 30 and heater 34 is trapped in the central compartment, and is also available for immediate load use. Whenever the demand ceases, as signalled by thermostat 48 to deactuate load pump 40, the previously described radially outward flow of water in the tank, as produced by input pump 30, will be resumed and will continue, thus depositing additional heat in the tank, unless and until the tank temperature is sufficiently high that thermostat 31 deactuates input pump 30 and heater 34.

As just described, the form of the system shown in FIGS. 1 and 2 is prevented from vaporizing the tank water by thermostat 31, which is set to deactuate the heat input at a maximum tank water temperature at least slightly below its boiling point. Any vaporization of the water would simply generate steam which would be lost to atmosphere at vent 10, and would represent wasted energy. FIG. 3, however, shows a modification of the system which permits vaporization of some of the tank water, and the retention and storage of the large amount of latent heat required to produce said vaporization. This provision greatly increases the heat storage capacity of a tank of any given liquid capacity.

The FIG. 3 species is substantially identical to that of FIG. 1, except for certain modifications. It is provided with a heat shield dome 50 disposed within tank 2, covering all of the tank compartments except outermost compartment 18, and is provided with a cylindrical skirt 52 which loosely surrounds outermost wall 12 and projects downwardly sufficiently to extent beneath tank liquid level 22 at all times. The dome may be insulated, as shown. It is fixed in the tank by any suitable means, not shown. The heat input system, consisting of pump 30 and heater 34, instead of being controlled by a thermostat as at 31 of FIG. 1, is controlled by a pressure-sensitive device, or "pressurestat" 58 disposed within dome 50 above liquid level 22, and operable to deactuate pump 30 and/or heater 34 whenever the vapor pressure under the dome exceeds a pre-determined positive pressure. The load return pipe 46 is connected to a two-position valve 60 which in one position directs the return water to outermost tank compartment 18 through pipe 62, and in a second position, as illustrated, directs the return water through a pipe 64 to a spray nozzle 66 disposed within dome 50 above water level 22. Valve 60 is controlled by a valve operator 68 also subject to pressurestat 58, so as to retain said valve in its first position so long as the dome pressure remains below the preset control pressure of the pressurestat, and to move said valve to its illustrated second position whenever the dome pressure reaches or exceeds said control pressure.

As long as the maximum water temperature within the tank remains below the boiling point, the operation of the FIG. 3 species is substantially identical to that of FIG. 1, the input flow generated by pump 30 passing through heater 34 to the central tank compartment, and radially outwardly through the tank compartments to return to pump 30, while the load flow of pump 40, when required, proceeds through load 44 and valve 60 (then in its first position) to the outermost tank compartment then radially inwardly through the tank compartments to return to pump 40. However, in periods of no heat demand by the load, the maximum water temperature in the central tank compartment may rise to the boiling point. As heat is further added, a portion of the water is converted to steam, as it absorbs additional heat in an amount equal to the latent heat of vaporization. The steam creates a positive pressure beneath the dome, lowering the liquid level therebeneath by forcing liquid outwardly through lower check valves 26, and elevating the water level in outermost tank compartment 18, as indicated at 70. The latent heat trapped in the steam represents a significant additional supply of heat available for later load use. The elevation of the water level outside of the dome also applies fluid pressure to the water within the dome. This raises the boiling point of the water, and hence increases the volume of heat which must be added thereto before its boils and vaporizes. This further increases the total heat storage capacity of the tank. When the steam pressure inside of the dome rises to the pre-set control level of pressurestat 58, said pressurestat functions to deactuate pump 30 and/or heater 34, and to move valve 60 to its illustrated second position, to direct the return load flow to nozzle 66. The control pressure of pressurestat 58 is set to allow only a permissable elevation of the water level 70 in outermost tank compartment 18, since higher dome pressures would allow water to be blown through vent 10, or steam to pass under the skirt 52 of the dome and hence to the vent, which would represent a waste of energy.

Then, if the load circuit has been actuated by thermostat 48, or is later so actuated, the return flow from load 44 is directed by valve 60 to nozzle 66, and is sprayed into the dome. Being cooler than the steam in the dome, it absorbs heat therefrom, including and taking advantage of the latent heat stored therein, and falls back into tank compartments 14 and 16, where it rejoins the flow currents of the tank at the most advantageous points, that is, at the tops of the associated tank compartments, in position to flow to the central compartment through upper check valves 24 in the normal load flow pattern of the tank. It should be understood, however, that the use of transfer valve 60 and nozzle 66, while desirable in that it provides a faster recovery of the latent heat of any steam trapped in the dome, is optional only. The heat content of the steam in the dome would eventually be returned to the tank liquid even in the absence of these elements, as the tank liquid is cooled by the heat removed therefrom at load 44.

FIG. 4 shows a modification of the system adapted to store "negative heat", or coldness, whereby to assist in the operation of heat-absorbing load devices. Its arrangement is generally similar to FIG. 1, with certain modifications. In this case, heat exchanger 34 constitutes a cooling device, or cooler, such as a refrigeration unit, whereby the temperature of the water is reduced, and load 44 constitutes a heat absorption device, such as a fluid-operated home air conditioning system. Also, upper check valves 24 open outwardly, lower check valves 26 open inwardly, intake pipe 28 and delivery pipe 36 of the cooler extend adjacent the water level 22 in the tank, and intake pipe 38 and delivery pipe 46 of load 44 open into the bottom of compartments 14 and 18, all of which are substantial reversals from the conditions of FIG. 1. The operation of pump 30 and cooler 34 is controlled by a thermostat 74 disposed adjacent the bottom of tank compartment 14, where as will appear, the coldest water of the tank is always concentrated, said thermostat being operable to actuate said pump and cooler whenever the water temperature rises above a pre-determined maximum useful level, and to deactuate said pump and cooler whenever the water falls to a predetermined minimum level the latter level being slightly above the freezing point to prevent any freezing of the tank water. The load pump is actuated by a thermostat 76 whenever load 44 requires the extraction of heat.

In operation of the FIG. 4 species, it will be seen that cold water flowing from cooler 34 is delivered to the top of central tank compartment 14 by pipe 36. In said compartment, the colder water sinks and the warmer water rises by convection, and the water level in compartment 14 rises slightly to open upper check valves 24 of inner wall 12, to allow the warmer top water to flow outwardly to chamber 16, where the process repeats itself to concentrate the colder water at the bottom and warmer water at the top, and raise the water level slightly to open the upper check valves 24 of outer wall 12 to pass the warmer water to chamber 18, where the convection separation of the colder and warmer water again occurs and the warmer water is returned to pump 30 for further cooling by cooler 34. On the other hand, when water is returned to the bottom of outermost compartment 18 by load pump 40, cooler water sinks to the bottom of the compartment and warmer water rises by convection, and the water level is raised slightly to open lower check valves 26 of outer wall 12 to allow the coldest water to pass into compartment 16, where the process repeats itself with the coldest water eventually being deposited in the lower portion of central compartment 14 for return to load 44 by pump 40. Thus the "input" pump 30 tends to produce a radially outwardly flow of water in the tank, while the load pump 40 tends to produce a radially inward flow in the tank, which is the same as in FIG. 1, although the flows are reversed as to the upper and lower portions of the tank, and the actual direction of flow depends on which flow is larger at any given time. Since the flow rate of pump 40 is normally greater than the flow rate of pump 30, the radially inward load flow prevails whenever pump 40 is operative. The coldest water is always concentrated at the lower portion of central compartment 14, and the coldest water from the other compartments is always available to flow to the central compartment through check valves 26 in periods of high load demand.

Presuming that cooler 72 is capable of producing sub-freezing temperatures, it will be apparent that in periods of low or zero cooling load demand, the water in central compartment 14 could be frozen. Although the water temperature is normally lowest at the bottom of compartment 14, the freezing would start at the water surface 22 of this compartment due to the phenomenon that water expands as it approaches the freezing point, and therefore is reduced in specific gravity and rises to the surface. Such freezing cannot be allowed since it would interfere with the described convection and gravity flow patterns of the water. Thermostat 74 is hence set to deactuate pump 30 and cooler 34 before the water is cooled to the level at which its pre-freezing expansion commences. Of course, however, while liquid 20 has for convenience been described as water, said liquid is preferably a brine, water-alcohol mixture or other liquid having a much lower freezing point than water. In this manner, the "cold" storage capacity of the tank is greatly increased. The setting of thermostat 74 would then be changed to cut off the inlet flow at a much lower temperature, although said cut-off temperature is preferably maintained sufficiently high that the temperature in outermost compartment 18 is sufficiently high to minimize any heat absorption through outer tank wall 4.

FIG. 5 shows a modification of the species of the system of FIG. 4 which permits the freezing of a quantity of water, whereby to increase the cold storage capacity of the tank by an amount equal to the latent heat of fusion of the ice. The FIG. 5 species is identical to that of FIG. 4 except that a sealed or encapsulated tank 78 containing water (or ice) 80 is supported in central tank compartment 14 by any suitable means, not shown. The liquid 20 which circulates in tank 2 may be the brine or water-alcohol mixture previously mentioned. Tank 78 is flexibly expansible to accomodate the expansion of the ice as it freezes.

In operation of the FIG. 5 species, it will be seen that the cold liquid delivered by pump 30 to the top of compartment 14 and passing downwardly around tank 78 will eventually cool the water in tank 78 to the freezing point, and additionally remove the latent heat of fusion therefrom to convert it to ice. On the other hand, the warmer load return liquid, circulating upwardly in compartment 14 as already described, will transfer heat into tank 78, in an amount equal to the latent heat of fusion, and hence be cooled, before the ice melts. The latent heat of fusion is sufficiently greater, in proportion to the water volume, to constitute the water in tank 78 a heat sump of significant capacity into which the load heat may be dispersed, thereby increasing the cold storage capacity of tank 2 and reducing peak loads on cooler 34. Tanks 78 could also be placed in compartments outwardly from central compartment 14, if desired, so long as the temperature of liquid 20 in said outer compartments was sufficiently low to freeze the water. However, it is an important object of the invention to minimize the temperature differential across outer tank wall 4, whereby to minimize entry of exterior heat into the system. For this reason, thermostat 74 functions to deactuate the cooler, and hence to preserve the desired upward temperature gradient from central compartment 14 outwardly. Therefore, it is neither likely nor desirable that the temperature of liquid 20 in the outermost compartments of tank 2 would be sufficiently low to freeze water encapsulated therein. of course, if tank 2 contained a greater number of compartments, freezing could be permitted in a greater number of the more central compartments.

While I have shown and described certain specific embodiments of my invention, it will be readily apparent that many minor changes of structure could be made without departing from the spirit of the invention.

What I claim as new and desire to protect by Letters Patent is:

1. A heat storage system comprising:
   a. a tank containing a liquid and provided with interior walls dividing it into a central compartment and a plurality of generally annular compartments horizontally encircling said central compartment, said compartments being open at their tops and said tank being vented to atmosphere at its top, the warmest liquid in each compartment tending to rise and the coolest liquid to sink by virtue of convection currents therein,
   b. check valves mounted in each of said interior walls, below the liquid level of said tank and respectively adjacent the liquid level and bottom of said tank, each of said check valves being operable to permit the flow of liquid through the associated wall in one direction only, the upper and lower check valves being operable to permit flow in respectively opposite directions, c. a heat exchanger device exterior to said tank, d. a heat load device exterior to said tank, e. an input flow system operable to withdraw liquid from the outermost compartment of said tank, pass it to said heat exchanger device whereby its temperature is changed, and return it to said central tank compartment, and f. a load flow system operable to withdraw liquid from the central tank compartment, pass it to said heat load device wherein its temperature is oppositely changed, and return it to the outermost tank compartment, said check valves opening in directions to permit the flow of liquid of the temperature closest to the output temperature of said heat exchanger from the outermost to the central compartment, and the flow of liquid of the temperature farthest from the output temperature of said heat exchanger from the central to the outermost compartment, whereby whenever said input flow exceeds said load flow, the general flow of liquid in the tank is from the central to the outermost tank compartment, and whenever said load flow exceeds said input flow, the general flow of liquid in the tank is from the outermost to the central tank compartment, the flow rate of said load flow system, when said system is actuated, being greater than the flow rate of said input flow system.

2. A system as recited in claim 1 wherein said heat exchanger constitutes a heater and said load constitutes a heat-removing device, and wherein the upper of said check valves open inwardly and the lower of said check valves open outwardly.

3. A system as recited in claim 2 wherein said heater is capable of producing liquid temperatures capable of vaporizing said liquid, and with the addition of thermostatic control means operable to deactuate said input flow system whenever the maximum liquid temperature within said tank rises sufficiently to approach said vaporization temperature.

4. A system as recited in claim 2 wherein said heater is capable of producing liquid temperatures capable of vaporizing said liquid, and with the addition of a heat shield dome mounted in said tank to cover at least said central compartment in spaced relation above the liquid level therein, and having a skirt depending beneath the liquid level in a relatively outwardly spaced compartment, whereby vapor produced at the liquid level in said central compartment collects in said dome to create a positively elevated vapor pressure, said pressure elevating the tank liquid level outside of said dome to pressurize the liquid within the dome, whereby to elevate the boiling point thereof to increase the temperature required to vaporize it, whereby to increase the heat storage capacity thereof, and said vapor serving to store the latent heat of vaporization added thereto to vaporize it.

5. A system as recited in claim 4 with the addition of a pressure-sensitive control device disposed within said dome and operable to deactuate said input flow system whenever the vapor pressure within said dome exceeds a predetermined level, whereby to prevent liquid being elevated in said outer compartment by said pressure, or vapor passing beneath the dome skirt, from escaping through said tank vent.

6. A system as recited in claim 5 with the addition of a two-position transfer valve disposed in said load flow system, being operable in a first position to deliver the return load liquid to the outermost compartment of the tank, and in a second position to deliver said return liquid to a spray nozzle disposed within said dome, said valve being operated by said pressure-sensitive control to be in said first position whenever said input flow system is actuated, and to be in said second position whenever said input flow system is deactuated.

7. A system as recited in claim 1 wherein said heat exchanger constitutes a liquid cooler, and said load constitutes a heat-absorption device, and wherein said upper check valves open outwardly and the lower of said check valves open inwardly.

8. A system as recited in claim 7 wherein said liquid cooler is capable of producing liquid temperatures sufficiently low to freeze said liquid, and with the addition of a thermostatic control operable responsively to the lowest liquid temperature within said tank to deactuate said input flow system before said lowest tank liquid temperature falls to its freezing point.

9. A system as recited in claim 8 with the addition of a capsule tank disposed within at least the central compartment of said tank, said capsule tank containing a liquid having a freezing point higher than that of the tank liquid, and higher than the control temperature of said thermostatic control, whereby said capsule tank liquid may be frozen during periods when the load flow system is deactuated, and melted by warmer tank liquid circulated around said capsule tank during periods when said load flow system is actuated, in order that said load flow system may deposit its return heat into said capsule tank liquid in an amount equal to the latent heat of fusion necessarily removed from said capsule tank liquid to freeze it, and hence reduce the operating load on said cooler.

* * * * *